United States Patent
Ryu et al.

(10) Patent No.: US 10,886,790 B2
(45) Date of Patent: Jan. 5, 2021

(54) RECONFIGURABLE ELECTROMAGNETIC WAVE SHIELDING FILTER, WIRELESS CHARGER FOR VEHICLE HAVING THE SAME, AND CONTROL METHOD THEREOF

(71) Applicants: HYUNDAI MOTOR COMPANY, Seoul (KR); KIA MOTORS CORPORATION, Seoul (KR)

(72) Inventors: Kwang Woo Ryu, Incheon (KR); Jang Soon Han, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 185 days.

(21) Appl. No.: 16/203,216

(22) Filed: Nov. 28, 2018

(65) Prior Publication Data

US 2020/0091777 A1 Mar. 19, 2020

(30) Foreign Application Priority Data

Sep. 14, 2018 (KR) .......................... 10-2018-0110120

(51) Int. Cl.
| | |
|---|---|
| *H01M 6/50* | (2006.01) |
| *H02J 50/70* | (2016.01) |
| *H02J 50/80* | (2016.01) |
| *B60R 16/033* | (2006.01) |
| *H02J 50/12* | (2016.01) |

(52) U.S. Cl.
CPC ............ *H02J 50/70* (2016.02); *B60R 16/033* (2013.01); *H02J 50/12* (2016.02); *H02J 50/80* (2016.02)

(58) Field of Classification Search
USPC ........ 320/106, 107, 108, 109, 111, 136, 137
See application file for complete search history.

(56) References Cited

U.S. PATENT DOCUMENTS

| 10,424,976 B2 * | 9/2019 | Verghese .............. B60L 53/124 |
| 2009/0115555 A1 | 5/2009 | Kim et al. |
| 2010/0109445 A1 * | 5/2010 | Kurs ....................... B60L 55/00 307/104 |
| 2010/0156562 A1 | 6/2010 | Kim |

(Continued)

FOREIGN PATENT DOCUMENTS

| JP | 11176696 A | 7/1999 |
| JP | 2005295316 A | 10/2005 |

(Continued)

*Primary Examiner* — Brian Ngo
(74) *Attorney, Agent, or Firm* — Mintz Levin Cohn Ferris Glovsky and Popeo, P.C.; Peter F. Corless

(57) ABSTRACT

A reconfigurable electromagnetic wave shielding filter is provided in a wireless charger for a vehicle and capable of selectively shielding an electromagnetic wave (EMI noise) that interferes with an AM broadcast band, an electromagnetic wave that interferes with a FM broadcast band, and an electromagnetic wave that interferes with a DMB broadcast band. A wireless charger for a vehicle includes the reconfigurable electromagnetic wave shielding filter and a control method thereof, in which broadcast information being received by the user is collected, and then, an electromagnetic wave that interferes with a broadcast band corresponding to the collected broadcast information is shielded, thereby to allow the user to listen to the broadcast without noise.

17 Claims, 11 Drawing Sheets

(56) References Cited

U.S. PATENT DOCUMENTS

| | | | |
|---|---|---|---|
| 2010/0244580 A1* | 9/2010 | Uchida | H02J 7/025 307/104 |
| 2011/0043050 A1* | 2/2011 | Yabe | H04B 5/0087 307/104 |
| 2011/0254378 A1* | 10/2011 | Ichikawa | H02J 50/80 307/104 |
| 2012/0299390 A1* | 11/2012 | Kim | B60L 53/122 307/104 |
| 2014/0049118 A1* | 2/2014 | Karalis | H01F 38/14 307/104 |
| 2015/0372496 A1* | 12/2015 | Lee | H02J 7/00034 307/104 |
| 2016/0028248 A1* | 1/2016 | Asanuma | H02J 50/90 307/104 |
| 2016/0172894 A1* | 6/2016 | Khripkov | H02J 50/40 320/108 |
| 2017/0141615 A1 | 5/2017 | Moon et al. | |
| 2018/0198323 A1* | 7/2018 | Widmer | B60L 53/124 |
| 2019/0016226 A1* | 1/2019 | Misawa | H02J 7/025 |
| 2019/0027966 A1* | 1/2019 | Cho | H01F 38/14 |
| 2019/0081516 A1* | 3/2019 | Shahsavari | G01R 27/2611 |
| 2019/0173325 A1* | 6/2019 | Ichikawa | H02J 50/10 |
| 2019/0181693 A1* | 6/2019 | Kato | H02J 50/80 |
| 2020/0235613 A1* | 7/2020 | Kanno | H02J 50/90 |

FOREIGN PATENT DOCUMENTS

| | | | |
|---|---|---|---|
| JP | 2014124003 A | 7/2014 | |
| KR | 1020120082768 A | 7/2012 | |
| KR | 1020120082769 A | 7/2012 | |
| KR | 1020170009683 A | 1/2017 | |

* cited by examiner

US 10,886,790 B2

RECONFIGURABLE ELECTROMAGNETIC WAVE SHIELDING FILTER, WIRELESS CHARGER FOR VEHICLE HAVING THE SAME, AND CONTROL METHOD THEREOF

CROSS-REFERENCE TO RELATED APPLICATION

This application claims the benefit of priority to Korean Patent Application No. 10-2018-0110120, filed in the Korean Intellectual Property Office on Sep. 14, 2018, the entire contents of which are incorporated herein by reference.

TECHNICAL FIELD

The present disclosure relates to a reconfigurable electromagnetic wave shielding filter, a wireless charger for a vehicle having the same, and a method of controlling the reconfigurable electromagnetic wave shielding filter in the wireless charger for the vehicle.

BACKGROUND

The technology of wireless transmission of electric power is mainly used in the field of smart phones, and recently it is gradually expanding to wearable devices, IoT (Internet of Things), electric vehicle charging related fields, and the like. The electric power to be transmitted also increases from a small output to a large output, and there is also a concern about electromagnetic wave emitted in addition to a purpose of transmission. Herein, the electromagnetic wave is an electromagnetic wave other than a signal to be transmitted, which means EMI (Electro Magnetic Interference) noise, EMC (Electro Magnetic Compatibility) noise, and the like.

SUMMARY

An aspect of the present disclosure provides a reconfigurable electromagnetic wave shielding filter provided in a wireless charger for a vehicle and capable of selectively shielding an electromagnetic wave (EMI noise) that interferes with an AM broadcast band, an electromagnetic wave that interferes with a FM broadcast band, and an electromagnetic wave that interferes with a DMB broadcast band.

Further, an aspect of the present disclosure also provides a wireless charger for a vehicle having the above-mentioned reconfigurable electromagnetic wave shielding filter.

Furthermore, an aspect of the present disclosure provides a wireless charger for a vehicle having a reconfigurable electromagnetic wave shielding filter and a control method thereof, in which broadcast information being received by the user is collected, and, then, an electromagnetic wave that interferes with a broadcast band corresponding to the collected broadcast information is shielded, thereby to allow the user to listen to the broadcast without noise.

According to an aspect of the present disclosure, a device of the present disclosure for achieving the above-mentioned purpose is a reconfigurable electromagnetic wave shielding filter including: a loop-shaped shielding coil; a first capacitor having one end thereof connected to a start point of the shielding coil and the other end thereof connected to an end point of the shielding coil; a second capacitor having one end thereof connected to the start point of the shielding coil and the other end thereof connected to a first point and a second point of the shielding coil; a first switch configured to transmit a current flowing through the shielding coil to the other end of the first capacitor or to the other end of the second capacitor; and a second switch configured to transmit the current flowing through the shielding coil to the other end of the second capacitor or to the first switch.

When a pattern is generated such that one end of the low-frequency capacitor is electrically connected to the start point of the shielding coil and the other end thereof is electrically connected to the end point of the shielding coil, the electromagnetic wave shielding filter may shield an electromagnetic wave that interferes with an AM broadcast band.

Further, when a pattern is generated such that one end of the high-frequency capacitor is electrically connected to the start point of the shielding coil and the other end thereof is electrically connected to the first point of the shielding coil, the electromagnetic wave shielding filter may shield an electromagnetic wave that interferes with a DMB broadcast band.

Further, when a pattern is generated such that one end of the high-frequency capacitor is electrically connected to the start point of the shielding coil and the other end thereof is electrically connected to the second point of the shielding coil, the electromagnetic wave shielding filter may shield an electromagnetic wave that interferes with a FM broadcast band.

In embodiments, the first switch may include: a second Field Effect Transistor (FET) positioned near a rear end of the second point; and a fourth FET positioned at a rear face of a printed circuit board (PCB), one end of the fourth FET connected to the other end of the second capacitor and the other end thereof connected to the second point of the shielding coil. In addition, the second switch may include: a first FET positioned near a rear end of the first point; and a third FET positioned at the rear face of PCB, one end of the third FET connected to the other end of the second capacitor and the other end thereof connected to the first point of the shielding coil.

In addition, the shielding coil defines a closed-loop together with the low-frequency capacitor or the high-frequency capacitor.

In embodiments, another device of the present disclosure for achieving the above-mentioned purpose is a wireless charger for a vehicle having a reconfigurable electromagnetic wave shielding filter, and the wireless charger may including: a collecting unit configured to collect broadcast information being received by the vehicle; a voltage applying unit configured to apply a voltage to the reconfigurable electromagnetic wave shielding filter; and a controlling unit configured to control the voltage applying unit to generate a pattern corresponding to the broadcast information collected by the information collecting unit. In embodiments, the reconfigurable electromagnetic wave shielding filter may include: a loop-shaped shielding coil; a first capacitor having one end thereof connected to a start point of the shielding coil and the other end thereof connected to an end point of the shielding coil; a second capacitor having one end thereof connected to the start point of the shielding coil and the other end thereof connected to a first point and a second point of the shielding coil; a first switch configured to transmit a current flowing through the shielding coil to the other end of the first capacitor or to the other end of the second capacitor; and a second switch configured to transmit the current flowing through the shielding coil to the other end of the second capacitor or to the first switch.

In embodiments, the controlling unit may control the first switch and the second switch to generate a pattern such that the one end of the first capacitor is electrically connected to the start point of the shielding coil and the other end thereof is electrically connected to the end point of the shielding coil in order to shield an electromagnetic wave that interferes with an AM broadcast band.

Further, the controlling unit may control the first switch and the second switch to generate a pattern such that the one end of the low-frequency capacitor is electrically connected to the start point of the shielding coil and the other end thereof is electrically connected to the first point of the shielding coil in order to shield an electromagnetic wave that interferes with a DMB broadcast band.

Further, the controlling unit may control the first switch and the second switch to generate a pattern such that the one end of the high-frequency capacitor is electrically connected to the start point of the shielding coil and the other end thereof is electrically connected to the second point of the shielding coil in order to shield an electromagnetic wave that interferes with a FM broadcast band.

A method of the present disclosure for achieving the above-mentioned purpose is a method for controlling a reconfigurable electromagnetic wave shielding filter including: collecting broadcast information being received by a vehicle; and controlling the reconfigurable electromagnetic wave shielding filter to generate a pattern corresponding to the collected broadcast information. In embodiments, the reconfigurable electromagnetic wave shielding filter may include: a loop-shaped shielding coil; a first capacitor having one end thereof connected to a start point of the shielding coil and the other end thereof connected to an end point of the shielding coil; a second capacitor having one end thereof connected to the start point of the shielding coil and the other end thereof connected to a first point and a second point of the shielding coil; a first switch configured to transmit a current flowing through the shielding coil to the other end of the first capacitor or to the other end of the second capacitor; and a second switch configured to transmit the current flowing through the shielding coil to the other end of the second capacitor or to the first switch.

In embodiments, controlling the reconfigurable electromagnetic wave shielding filter may include controlling the first switch and the second switch to generate a pattern such that the one end of the first capacitor is electrically connected to the start point of the shielding coil and the other end thereof is electrically connected to the end point of the shielding coil in order to shield an electromagnetic wave that interferes with an AM broadcast band.

Further, controlling the reconfigurable electromagnetic wave shielding filter may include controlling the first switch and the second switch to generate a pattern such that the one end of the second capacitor is electrically connected to the start point of the shielding coil and the other end thereof is electrically connected to the first point of the shielding coil in order to shield an electromagnetic wave that interferes with a DMB broadcast band.

Further, controlling the reconfigurable electromagnetic wave shielding filter may include controlling the first switch and the second switch to generate a pattern such that the one end of the second capacitor is electrically connected to the start point of the shielding coil and the other end thereof is electrically connected to the second point of the shielding coil in order to shield an electromagnetic wave that interferes with a FM broadcast band.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
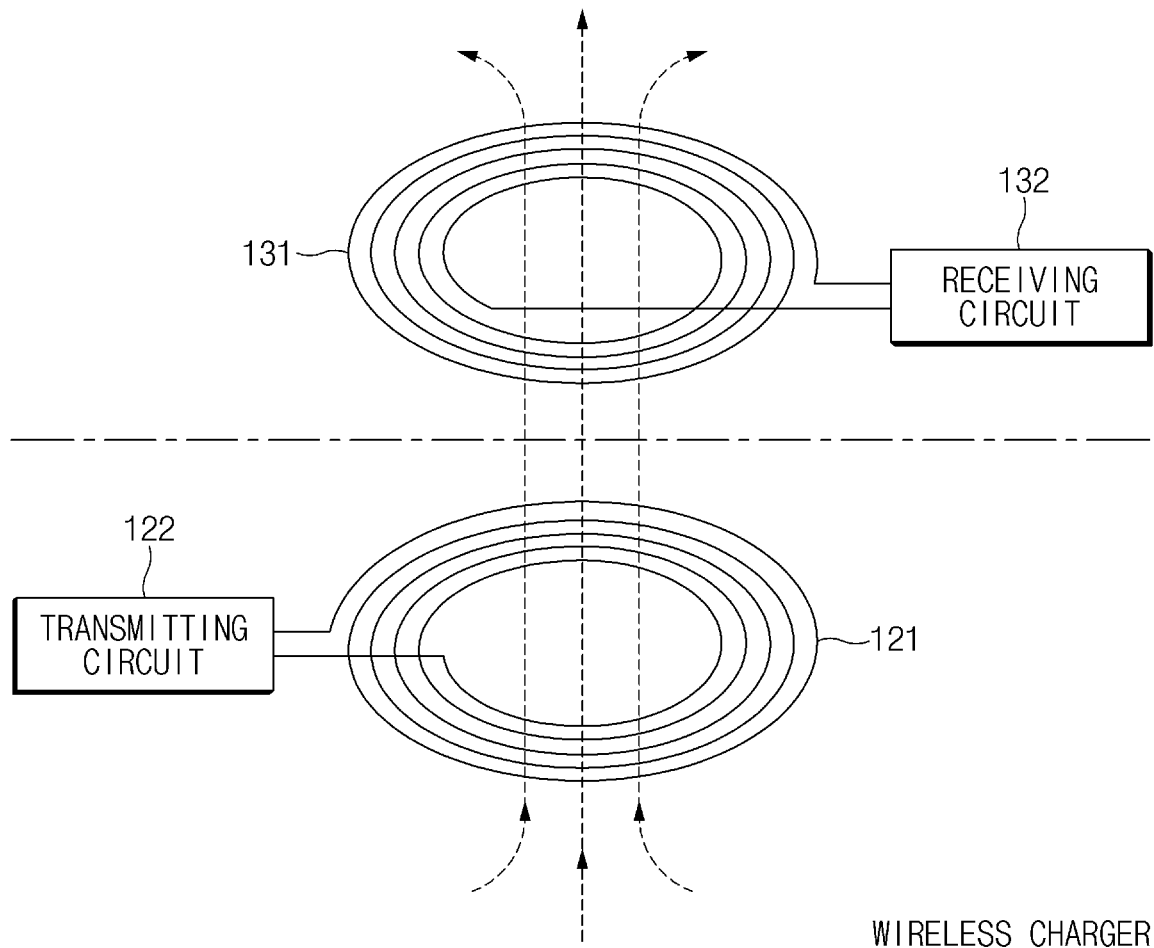
FIG. 1 shows an example of a structure of a wireless charging system to which the present disclosure is applied.

Hereinafter, embodiments of the present disclosure will be described in detail with reference to the drawings. It is to be noted that, in adding reference numerals to the constituent elements of the drawings, the same constituent elements are denoted by the same reference numerals whenever possible, even if they are shown in different drawings. Further, in the description of the embodiment of the present disclosure, a detailed description of related known structures or functions will be omitted when it is determined that the detailed description of the present disclosure interferes with the understanding of the embodiment of the present disclosure.

In describing the components of the embodiment of the present disclosure, terms such as first, second, A, B, (a), (b), etc. may be used. These terms are intended to distinguish the components from other components, and the nature, the turn, the order, and the like of the components are not limited by the terms. Unless otherwise defined, all terms used herein, including technical or scientific terms, have the same meaning as commonly understood by one of ordinary skill in the art to which the present disclosure pertains. Terms such as those defined in commonly used dictionaries are to be interpreted as having a meaning consistent with the contextual meaning of the related art and not interpreted as an ideal or overly formal sense unless explicitly defined in the present application.

In order to transmit the electric power wirelessly, a transmitting circuit for generating high output and high frequency electric power, a coil for transmitting it, and a receiving circuit are provided. Because the transmitting circuit that generates the electric power mostly uses a square wave, harmonic signals in addition to an electric power transmission frequency may be conducted or radiated through a wire, and they may be directly emitted to the outside through the coil for transmitting the electric power.

To minimize or avoid interference, these harmonic signals are mitigated as they may cause malfunction of components in the circuit or interfere with other devices around a wireless power transmission device. In addition, because devices sensitive to the electromagnetic waves have a strict electromagnetic wave intensity limit for power signals in addition to the power transmission frequency, the intensity limit is met in order to use a wireless power transmitting device (for example, a wireless charger) with these devices.

In particular, a wireless charger applied to a vehicle and charging a portable terminal (for example, a mobile phone, etc.) generates EMI noise upon wireless charging. The EMI noise thus generated may adversely affect (interfere with) AM (Amplitude Modulation) broadcasting signal, FM (Frequency Modulation) broadcasting signal, and DMB (Digital Multimedia Broadcasting) broadcasting signal output from a multimedia device (for example, head unit) mounted in the vehicle, thereby making normal reception of corresponding broadcasting signal difficult.

A typical electromagnetic wave shielding filter mounted in the vehicle wireless charger is a fixed filter for only a frequency band of a specific broadcast band and has a structure for reducing EMI noise related to one of the AM broadcast, the FM broadcast, and the DMB broadcast. Accordingly, EMI noise for each of the AM broadcast, the FM broadcast, and the DMB broadcast is not able to be selectively shielded.

In embodiments of the present disclosure, an electromagnetic wave refers to EMI (ElectroMagnetic Interference) noise, EMC (ElectroMagnetic Compatibility) noise, and the like.

FIG. 1 shows an example of a structure of a wireless charging system to which the present disclosure is applied.

As shown in FIG. 1, the wireless charging system to which the present disclosure is applied performs wireless charging using magnetic induction or magnetic resonance formed between a transmitting coil 121 of a wireless power transmitting device (hereinafter, a wireless charger) and a receiving coil 131 of a wireless power receiving device (hereinafter, a portable terminal).

A receiving circuit 122 of the wireless charger generates a high-frequency signal for transmitting the power wirelessly, and a magnetic field is generated when the high-frequency signal thus generated is input to the transmitting coil 121. An induced current is generated when the magnetic field generated in the transmitting coil 121 passes through the receiving coil 131 of the portable terminal. The induced current thus generated is rectified in a receiving circuit 132 and stored in a battery of the portable terminal.

The transmitting coil 121 and the receiving coil 131 are made of a conducting wire having a good conductivity. When the transmission energy is the magnetic field, a solenoid type coil or a helical type coil is mainly used.

In embodiments, in order to increase a power transmission efficiency of the wireless charging system, a circuit for impedance matching may be additionally connected to an input terminal of the transmitting coil 121 or an output terminal of the receiving coil 131.

The reconfigurable electromagnetic wave shielding filter according to embodiments of the present disclosure may be disposed between the transmitting coil 121 and the receiving coil 131 in parallel and may selectively shield an electromagnetic wave that interferes with an AM broadcast band, an electromagnetic wave that interferes with a FM broadcast band, and an electromagnetic wave that interferes with a DMB broadcast band, which are generated at the transmitting coil of the wireless charger. In embodiments, the reconfigurable electromagnetic wave shielding filter may be implemented on a PCB (Printed Circuit Board).

Figure 2:
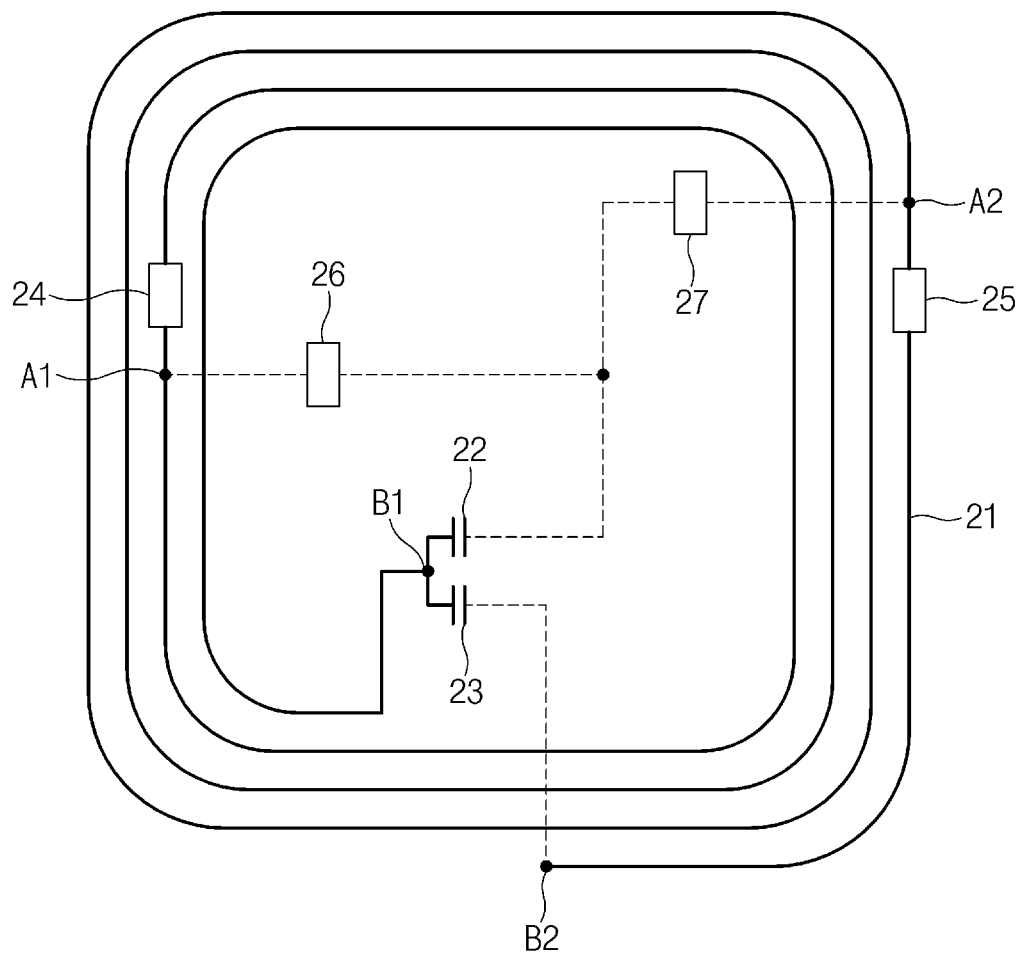
FIG. 2 is a top view of an embodiment of a reconfigurable electromagnetic wave shielding filter according to embodiments of the present disclosure.

FIG. 2 is a top view of an embodiment of a reconfigurable electromagnetic wave shielding filter according to embodiments of the present disclosure. The number of turns (pattern) of a shielding coil may be changeable based on the designer's intention (frequency band, etc.).

As shown in FIG. 2, the reconfigurable electromagnetic wave shielding filter according to embodiments of the present disclosure includes a shielding coil 21, a high-frequency capacitor 22 (a second capacitor), a low-frequency capacitor 23 (a first capacitor), a first FET (Field Effect Transistor) 24, a second FET 25, a third FET 26, and a fourth FET 27.

For each of the above components, first, the shielding coil 21 is a conductor (for example, copper) wound on the PCB so as not to cross each other from a start point B1 to an end point B2, and a shape thereof may be variously implemented in a circular shape, an oval shape, a polygon shape with rounded corners, and the like.

In order to shield the magnetic field, in embodiments, the shielding coil 21 generates a magnetic field having a reversed phase (phase difference of 180 degrees) for canceling a leakage magnetic field generated at the transmitting coil 121 of the wireless charger. This reverse phase cancels the leakage magnetic field generated by the transmitting coil. Herein, the leakage magnetic field is generated around the transmitting coil when current flows through the coil for the wireless power transmission, and it has a bad influence on the user's body or electronic devices near it. In addition, a cancellation of the leakage magnetic field means a reduction of the electromagnetic wave that eventually causes interference.

In particular, the shielding coil 21 may shield electromagnetic waves of different frequency bands depending on different patterns. In embodiments of the present disclosure, the electromagnetic wave that interferes with the AM broadcast band (520 KHz to 1.8 MHz), the electromagnetic wave that interferes with the FM broadcast band (76 MHz to 110 MHz), and the electromagnetic wave that interferes with the DMB broadcast band (174 MHz to 216 MHz) may be selectively shielded via varying the pattern of the shielding coil 21. In embodiments, an inductance range of the shielding coil 21 is preferably 0.01 pH to 100 pH.

Next, the shielding coil 21 and the capacitors 22 and 23 defining a closed-loop control a phase and a magnitude of the current induced in the closed-loop by adjusting a resonance frequency (resonance point) of the closed-loop. Thus, the leakage magnetic field may be completely canceled via generating an anti-phase magnetic field of the same magnitude as the leakage magnetic field. In embodiments, unlike a method of shielding the leakage magnetic field via using a ferrite or a metal shield, since the capacitor is used for shielding the leakage magnetic field, a relatively small size and a light weight may be realized. For reference, a capacitance of the capacitors 22 and 23 is preferably 10 pF to 100 µF.

Particularly, one end of the high-frequency capacitor 22 is connected to the start point B1 of the shielding coil 21 and the other end thereof is connected to a first point A1 and a second point A2 of the shielding coil 21 to shield the electromagnetic wave that interferes with the FM broadcast band and the electromagnetic wave interferes with the DMB broadcast band. In the illustrated embodiments, one end of the high-frequency capacitor 22 is connected to the start point B1 of the shielding coil 21 and the other end thereof is connected to the first point A1 of the shielding coil 21 to shield the electromagnetic wave that interferes with the DMB broadcast band. In addition, one end of the high-frequency capacitor 22 is connected to the start point B1 of the shielding coil 21 and the other end thereof is connected to the second point A2 of the shielding coil 21 to shield the electromagnetic wave that interferes with the FM broadcast band. In the illustrated embodiments, the first point and the second point are located between the start point and the end point. The first point is located between the start point and the second point. The second point is located between the first point and the end point.

In embodiments, the first point A1 is located near the start point B1 on the shielding coil 21 as compared to the second point A2, and generates a pattern that is capable of shielding the electromagnetic wave that interferes with the DBM broadcast band. In addition, the second point A2 is located farther from the start point B1 on the shielding coil 21 than the first point A1 and generates a pattern that is capable of shielding the electromagnetic wave that interferes with the FM broadcast band. In embodiments, the locations of the first point A1 and the second point A2 may be determined through calculation or experiment.

Further, one end of the low-frequency capacitor 23 is electrically connected to the start point B1 of the shielding coil 21 and the other end thereof is connected to the end point B2 of the shielding coil 21 to shield the electromagnetic wave that interferes with the AM broadcast band.

Next, the first FET 24 is positioned on a front face of the PCB, and is positioned near a rear end of the first point A1 (a next end of the first point A1 with respect to the start point B1). The first FET 24 serves to block the current flowing the shielding coil 21 depending on a control signal (voltage). In embodiments, the first FET 24 is located between the first point A1 and the second point A2.

Then, the second FET 25 is positioned on the front face of the PCB, and is positioned near a front end (a next end of the second point A2 with respect to the start point B1). The second FET 25 serves to block the current flowing the shielding coil 21 depending on the control signal (voltage). In embodiments, the second FET 25 is located between the end point B2 and the second point A2.

Then, the third FET 26 is positioned on a rear face of the PCB, one end of the third FET 26 is electrically connected to one end of the high-frequency capacitor 22, and the other end thereof is electrically connected to the first point A1 of the shielding coil 21. This third FET 26 serves to block the current flowing through the shielding coil 21 depending on the control signal (voltage). In embodiments, the third FET 26 is located between the first point A1 and the high-frequency capacitor 22.

Then, the fourth FET 27 is positioned on the rear face of the PCB and one end of the fourth FET 27 is electrically connected to one end of the high-frequency capacitor 22, and the other end thereof is electrically connected to the second point A2 of the shielding coil 21. This fourth FET 27 serves to block the current flowing through the shielding coil 21 depending on the control signal (voltage). In embodiments, the fourth FET 27 is located between the second point A2 and the high-frequency capacitor 22.

Figure 3:
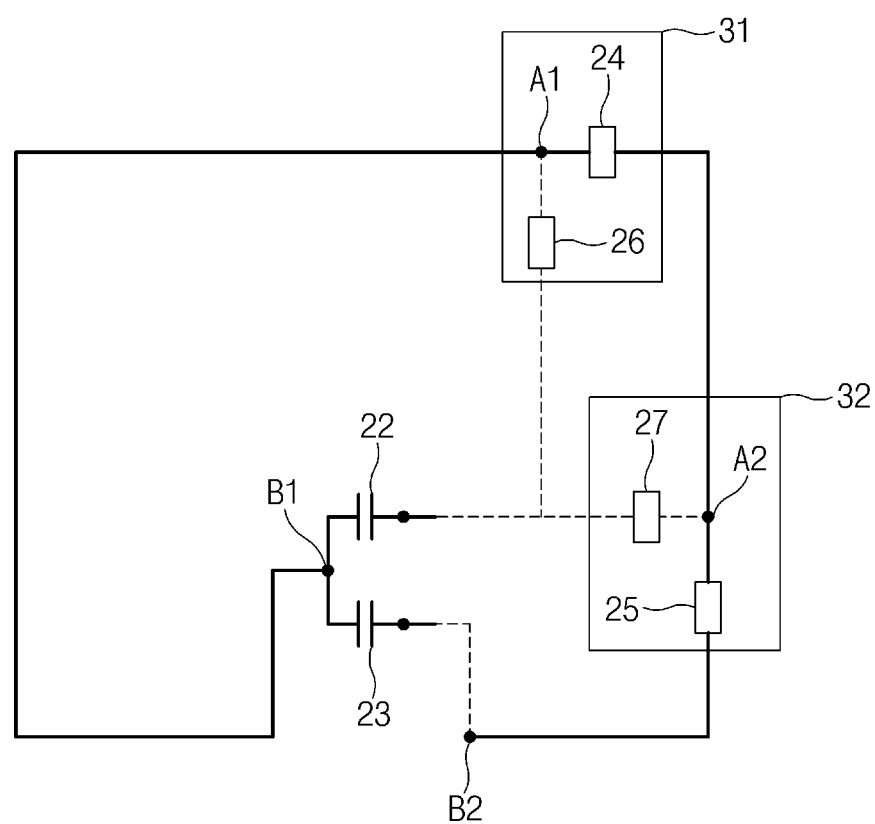
FIG. 3 is a schematic diagram of a reconfigurable electromagnetic wave shielding filter according to embodiments of the present disclosure.

FIG. 3 is a schematic diagram of a reconfigurable electromagnetic wave shielding filter according to embodiments of the present disclosure, briefly showing the number of turns (pattern) of the shielding coil 21 for ease of understanding.

In FIG. 3, reference numeral 32 denotes a first switch including the second FET 25 and the fourth FET 27, and serves to transmit the current flowing through the shielding coil 21 to the other end of the high-frequency capacitor 22 or to the other end of the low-frequency capacitor 23 depending on the control signal.

Reference numeral 31 denotes a second switch including the first FET 24 and the third FET 26, and transmits the current flowing through the shielding coil 21 to the other end of the high-frequency capacitor 22 or to the first switch 32 depending on the control signal.

Figure 4:
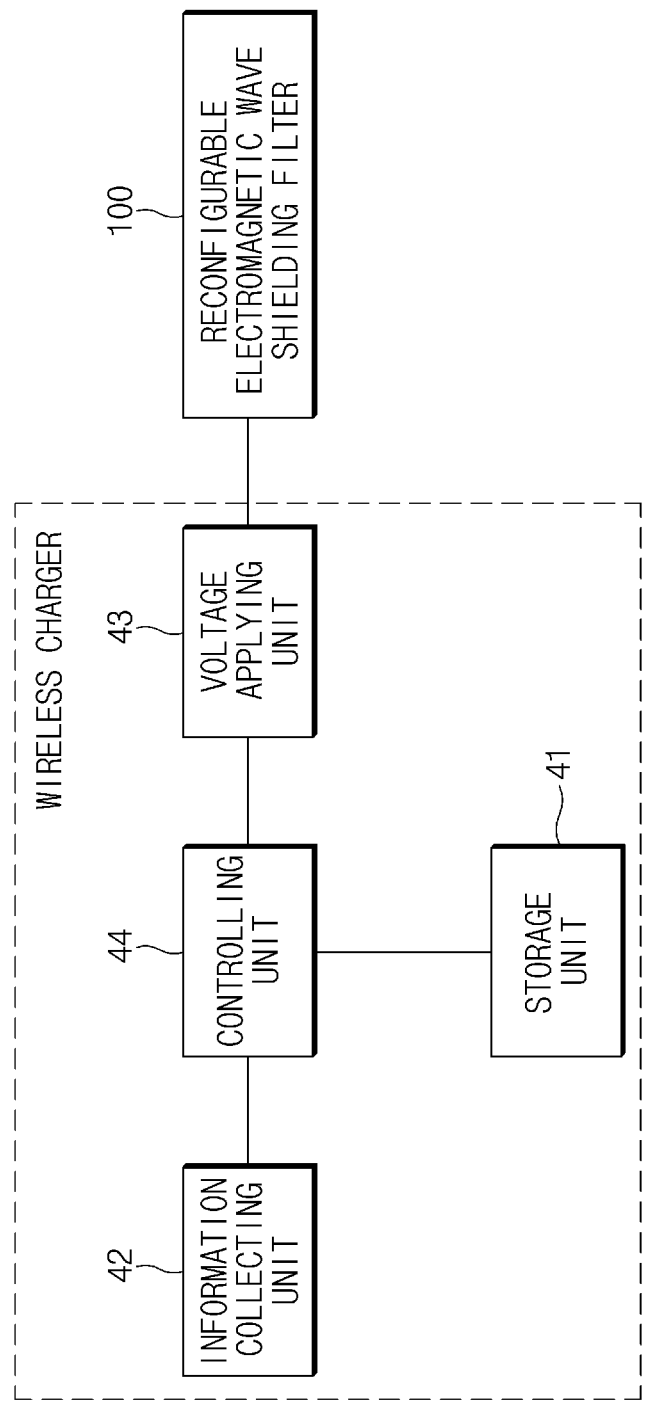
FIG. 4 is a block diagram of an embodiment of a wireless charger for a vehicle having a reconfigurable electromagnetic wave shielding filter according to embodiments of the present disclosure.

FIG. 4 is a block diagram of an embodiment of a wireless charger for a vehicle having a reconfigurable electromagnetic wave shielding filter according to embodiments of the present disclosure.

As shown in FIG. 4, the wireless charger for the vehicle having the reconfigurable electromagnetic wave shielding filter according to embodiments of the present disclosure may include a storing unit 41, an information collecting unit or information collector 42, a voltage applying unit or voltage source 43, and one or more controlling units or controllers 44. Depending on a manner of conducting the present disclosure, each component may be combined into one, and some components may be omitted depending on the manner in which the present disclosure is implemented.

Referring to the respective components, first, the storage unit 41 collects broadcast information that the user listens to in the wireless charger for the vehicle having the reconfigurable electromagnetic wave shielding filter, and then stores required logic, algorithm and program in a process of shielding that interferes with a broadcast band corresponding to the collected broadcast information.

This storage unit 41 may store information (operation information, operation voltage, and the like of each FET) necessary for a reconfigurable electromagnetic wave shielding filter 100 to generate the pattern for shielding the electromagnetic wave that interferes with the AM broadcast band, or to generate the pattern for shielding the electromagnetic wave that interferes with the FM broadcast band, or to generate the pattern for shielding the electromagnetic wave that interferes with the DMB broadcast band.

Herein, the storage unit 41 may include a storage medium of at least one type of memory such as a flash memory type, a hard disk type, a micro type, and a card type (for example, a SD card (Secure Digital Card), an XD card (eXtreme Digital Card), or the like) memory, a RAM (Random Access Memory), a SRAM (Static RAM), a ROM (Read-Only Memory), a PROM (Programmable ROM), EEPROM (Electrically Erasable PROM), a MRAM (Magnetic RAM), a magnetic disk, and optical disk type memory.

Next, the information collecting unit or information collector 42 collects or acquires the broadcast information being received by a multimedia system (AVN (Audio Video Navigation System), and the like) mounted in the vehicle. In embodiments, the broadcast information may include, but is not limited to, AM broadcast (AM radio), FM broadcast (FM radio), DMB broadcast, and the like.

This information collecting unit 42 may collect the broadcast information directly from the multimedia system or may collect it through a vehicle network. In embodiments, the vehicle network includes a CAN (Controller Area Network), a LIN (Local Interconnect Network), a FlexRay, a MOST (Media Oriented Systems Transport), and the like.

Next, the voltage applying unit or voltage supply 43 applies the voltage (control signal) such that the reconfigurable electromagnetic wave shielding filter 100 generates the pattern shielding the electromagnetic wave that interferes with the AM broadcast band or the pattern shielding the electromagnetic wave that interferes with the FM broadcast band, or the pattern shielding the electromagnetic wave that interferes with the DMB broadcast band. This voltage applying unit or voltage source 43 applies the voltage under a control of the controlling unit or controller 44.

Next, the controlling unit 44 serves overall control such that each of the above-mentioned components may perform their functions normally. The controlling unit 44 may be implemented in a form of hardware or software or may be a combination of hardware and software. Preferably, the controlling unit 44 may be implemented as a microprocessor, but is not limited thereto.

This controlling unit 44 controls the voltage applying unit such that the reconfigurable electromagnetic wave shielding filter 100 generates a pattern corresponding to the broadcast information collected by the information collecting unit 42.

Hereinafter, the operation of the controlling unit 44 will be described in detail with reference to FIG. 5 to FIG. 7.

Figure 5:
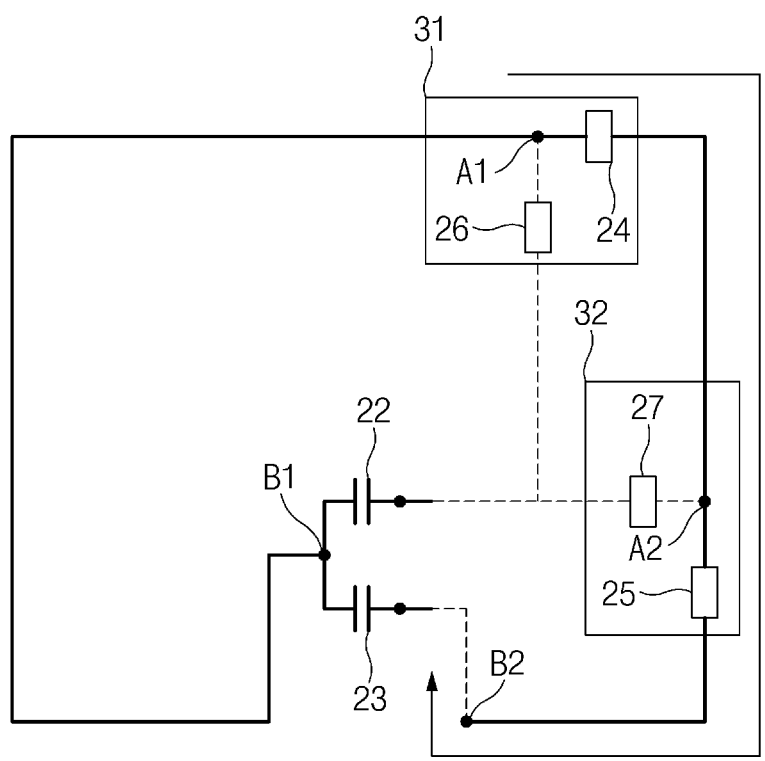
FIG. 5 shows an example of a pattern for an AM broadcast band of a reconfigurable electromagnetic wave shielding filter according to embodiments of the present disclosure.

FIG. 5 shows an example of a pattern for an AM broadcast band of a reconfigurable electromagnetic wave shielding filter according to embodiments of the present disclosure.

Figure 8:
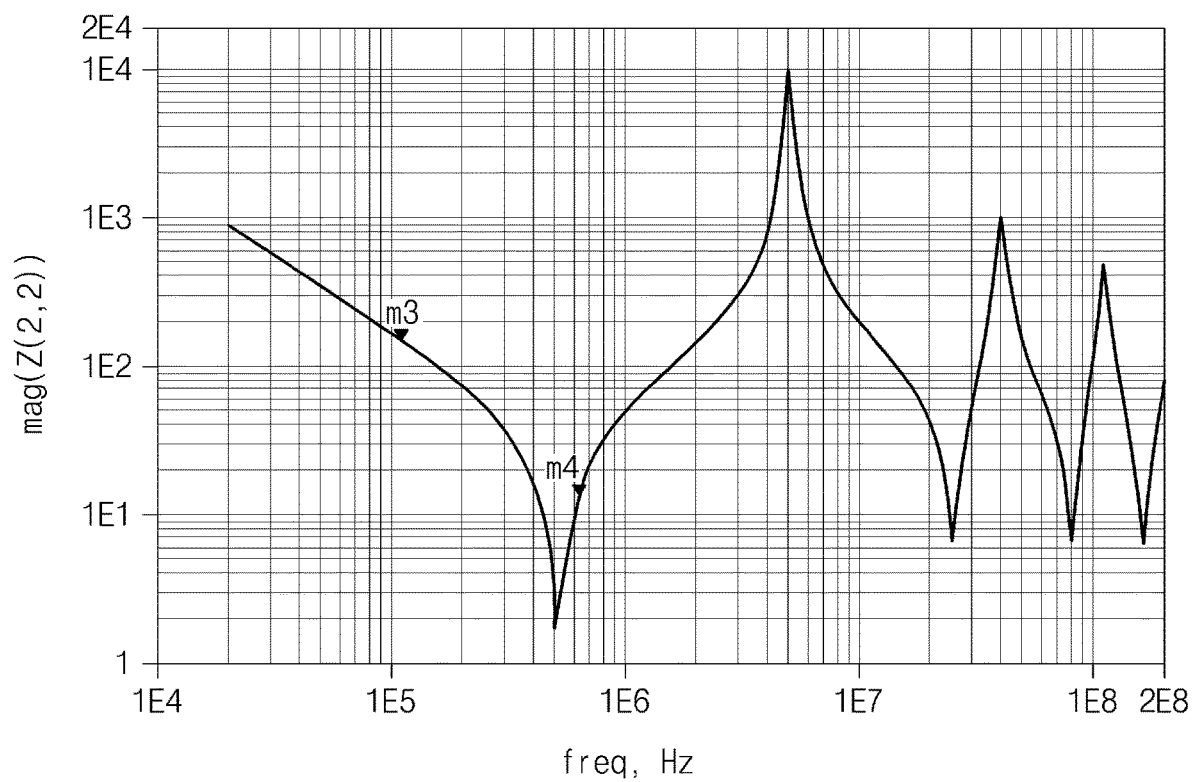
FIG. 8 shows an example of an impedance characteristics in an AM broadcast band of a reconfigurable electromagnetic wave shielding filter according to embodiments of the present disclosure.

The controlling unit 44 controls the first switch 32 and the second switch 31 via the voltage applying unit 43 such that the current flowing through the shielding coil 21 is transmitted to the other end of the low-frequency capacitor 23. In embodiments, the controlling unit 44 controls the voltage applying unit 43 to apply a voltage to the first FET 24 and the second FET 25 (ON state) and not to apply a voltage to the third FET 26 and the fourth FET 27 (OFF state) to generate a pattern (arrow) as shown in FIG. 5. The pattern thus generated has a sufficient impedance to filter the EMI noise in the AM broadcast band (520 KHz to 1.8 MHz), as shown in FIG. 8. In the embodiment illustrated in FIG. 5, the controller controls the FET 24 to connect between the first point A1 and the second point A2, controls the FET 25 to connect between the end point B2 and the second point A2, controls the FET 26 to disconnect between the first point A1 and the high-frequency capacitor 22, and controls the FET 27 to disconnect between the second point A2 and the high-frequency capacitor 22, thereby forming electric connection between one end of the low-frequency capacitor 23 and the other end of the low-frequency capacitor 23 through the entire portion of the shielding coil 21 from the start point B1 and the end point B2.

Figure 6:
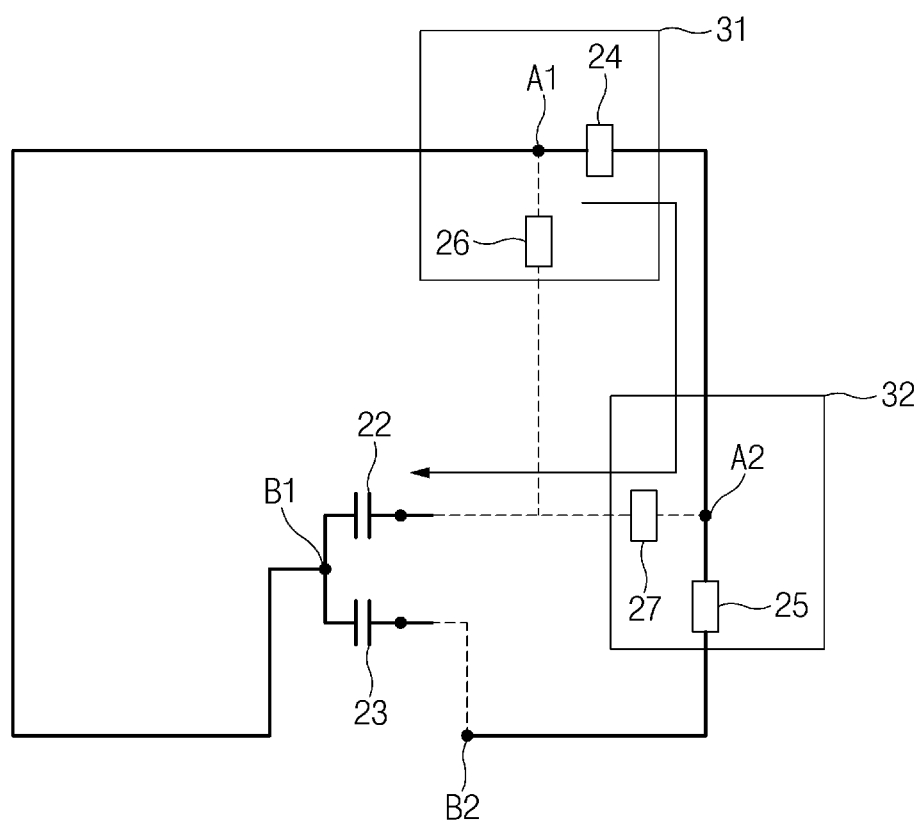
FIG. 6 shows an example of a pattern for a FM broadcast band of a reconfigurable electromagnetic wave shielding filter according to embodiments of the present disclosure.

FIG. 6 shows an example of a pattern for a FM broadcast band of a reconfigurable electromagnetic wave shielding filter according to embodiments of the present disclosure.

Figure 9:
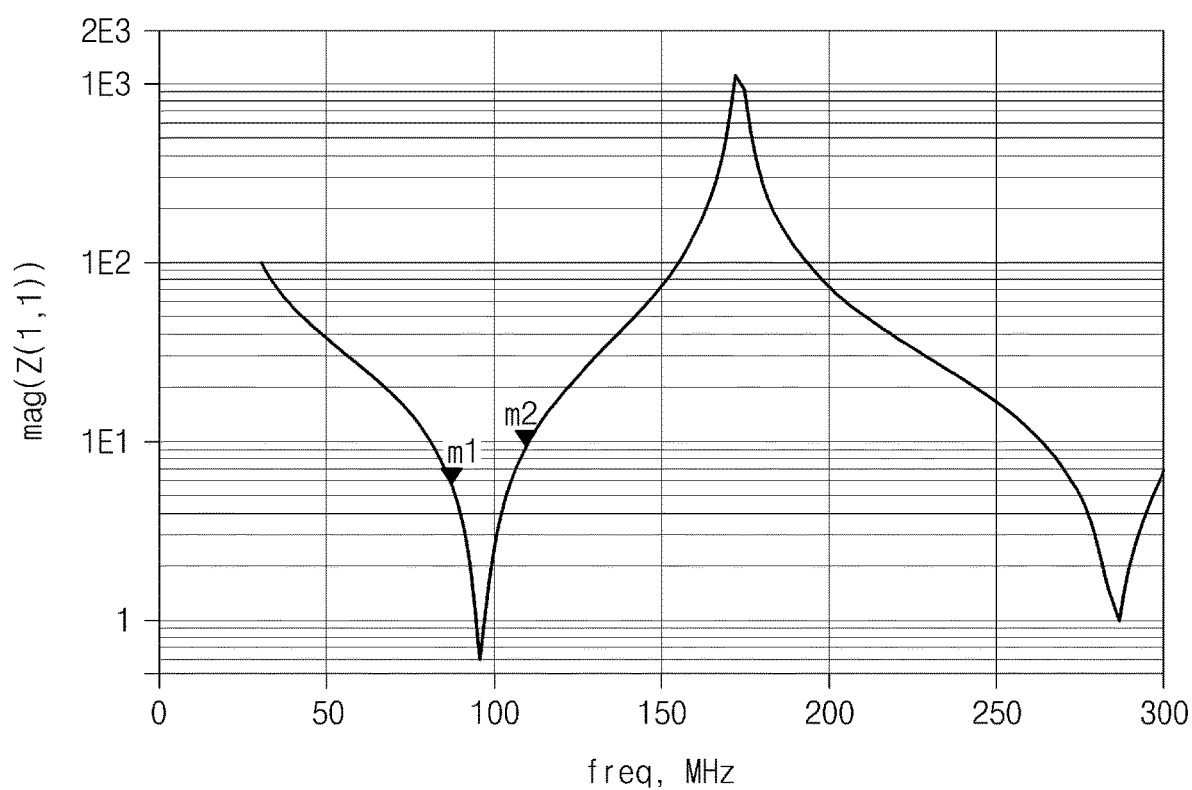
FIG. 9 shows an example of an impedance characteristics in a FM broadcast band of a reconfigurable electromagnetic wave shielding filter according to embodiments of the present disclosure.

The controlling unit 44 controls the first switch 32 and the second switch 31 via the voltage applying unit 43 such that the current flowing through the shielding coil 21 is transmitted directly from the second switch 31 to the other end of the high-frequency capacitor 22 without passing through the first switch 32. embodiments, the controlling unit 44 controls the voltage applying unit 43 to apply a voltage to the first FET 24 and the fourth FET 27 (ON state) and not to apply a voltage to the second FET 25 and the third FET 26 (OFF state) to generate a pattern (arrow) as shown in FIG. 6. The pattern thus generated has a sufficient impedance (for example, 10 or less) to filter the EMI noise in the FM broadcast band (76 MHz to 110 MHz) as shown in FIG. 9.

In the embodiment illustrated in FIG. 6, the controller controls the FET 24 to connect between the first point A1 and the second point A2, controls the FET 25 to disconnect between the end point B2 and the second point A2, controls the FET 26 to disconnect between the first point A1 and the high-frequency capacitor 22, and controls the FET 27 to connect between the second point A2 and the high-frequency capacitor 22, thereby forming electric connection between one end of the high-frequency capacitor 22 and the other end of the high-frequency capacitor 22 through a first section of the shielding coil 21 from the start point B1 and the first point A1 and a second section of the shielding coil 21 from the first point A1 and the second point A2.

Figure 7:
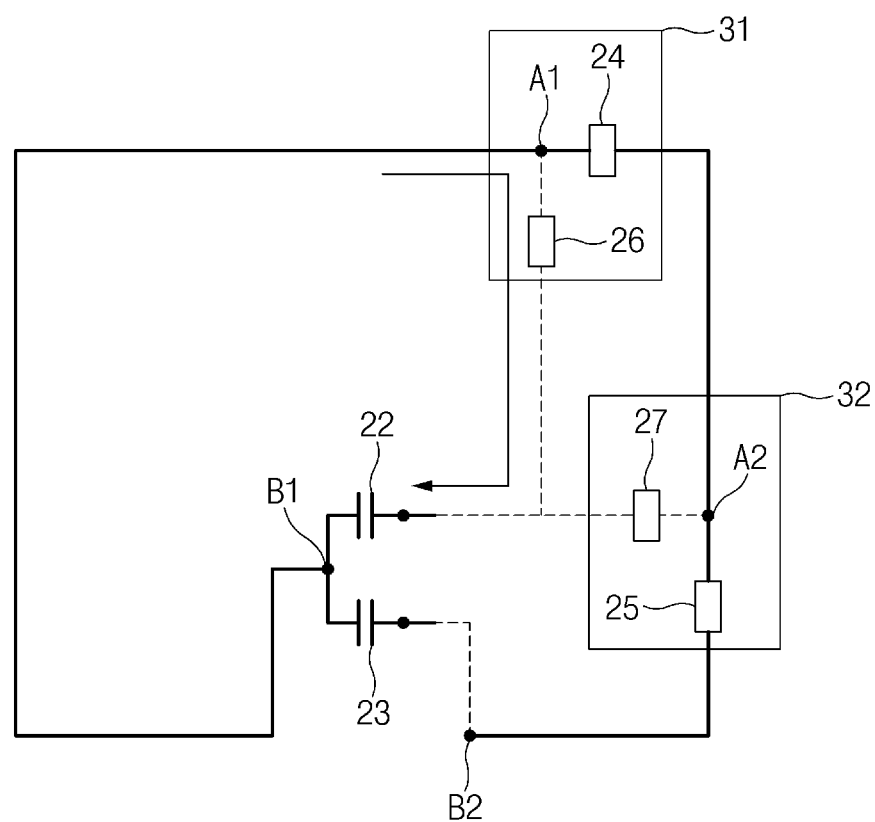
FIG. 7 shows an example of a pattern for a DMB broadcast band of a reconfigurable electromagnetic wave shielding filter according to embodiments of the present disclosure.

FIG. 7 shows an example of a pattern for a DMB broadcast band of a reconfigurable electromagnetic wave shielding filter according to embodiments of the present disclosure.

Figure 10:
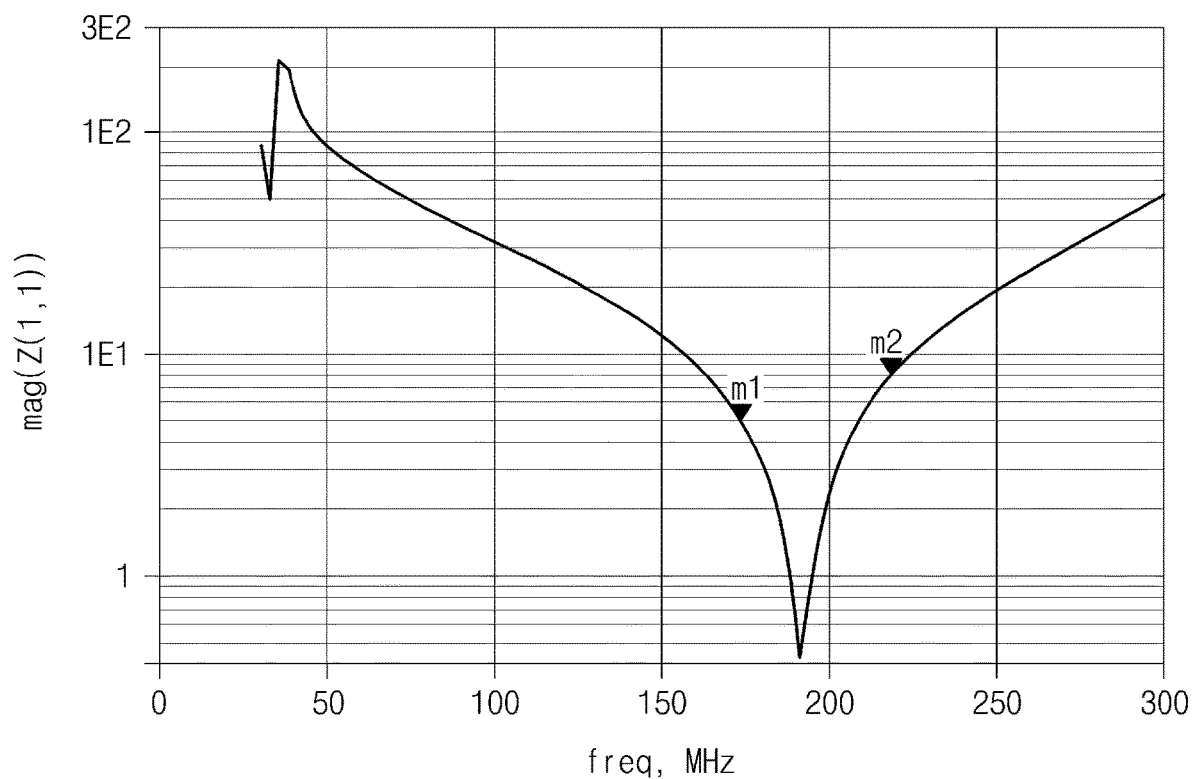
FIG. 10 shows an example of an impedance characteristics in a DMB broadcast band of a reconfigurable electromagnetic wave shielding filter according to embodiments of the present disclosure.

The controlling unit 44 controls the first switch 32 and the second switch 31 via the voltage applying unit 43 such that the current flowing through the shielding coil 21 is transmitted to the other end of the high-frequency capacitor 22 passing through the first switch 32. In embodiments, the controlling unit 44 controls the voltage applying unit 43 to apply a voltage to the third FET 26 (ON state) and not to apply a voltage to the first FET 24, the second FET 25 and the fourth FET 27 (OFF state) to generate a pattern (arrow) as shown in FIG. 7. The pattern thus generated has a sufficient impedance (for example, 10 or less) to filter the EMI noise in the DMB broadcast band (174 MHz to 216 MHz) as shown in FIG. 10. In the embodiment illustrated in FIG. 7, the controller controls the FET 24 to disconnect between the first point A1 and the second point A2, controls the FET 25 to disconnect between the end point B2 and the second point A2, controls the FET 26 to connect between the first point A1 and the high-frequency capacitor 22, and controls the FET 27 to disconnect between the second point A2 and the high-frequency capacitor 22, thereby forming electric connection between one end of the high-frequency capacitor 22 and the other end of the high-frequency capacitor 22 through only the first section of the shielding coil 21 from the start point B1 and the first point A1.

Figure 11:
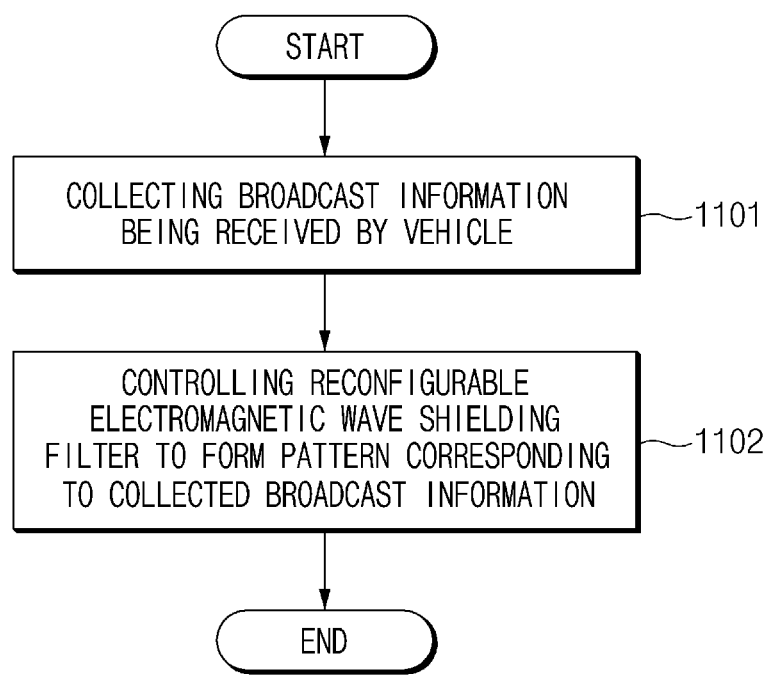
FIG. 11 is a flow chart of an embodiment of a control method of a reconfigurable electromagnetic wave shielding filter according to embodiments of the present disclosure.

FIG. 11 is a flow chart of an embodiment of a control method of a reconfigurable electromagnetic wave shielding filter according to embodiments of the present disclosure.

First, the information collecting unit 42 collects broadcast information being received by the vehicle in operation 1101. In embodiments, the information collecting unit 42 collects broadcast information that a driver is listening to.

Thereafter, the controlling unit 44 controls the reconfigurable electromagnetic wave shielding filter to generate a pattern corresponding to the broadcast information collected by the information collecting unit 42 in operation 1102. In embodiments, the controlling unit 44 controls a voltage via the voltage applying unit 43 to control the first switch 32 and the second switch 31 constituting the reconfigurable electromagnetic wave shielding filter. As a result, by controlling the voltage (control signal) applied to the first FET 24, the second FET 25, the third FET 26, and the fourth FET 27, the controlling unit 44 selectively generates the pattern for the AM broadcast band, the pattern for the FM broadcast band, and the pattern for the DMB broadcast band thereby selectively shielding the electromagnetic wave (EMI noise) that interferes with the AM broadcast band, the electromagnetic wave that interferes with the FM broadcast band, and the electromagnetic wave that interferes with the DMB broadcast band.

The present disclosure selectively shields the electromagnetic wave that interferes with the AM broadcast band, the electromagnetic wave that interferes with the FM broadcast band, and the electromagnetic wave that interferes with the DMB broadcast band via implementing the electromagnetic wave shielding filter provided in the wireless charger for the vehicle as reconfigurable.

Further, in accordance with the present disclosure, the wireless charger for the vehicle having the reconfigurable electromagnetic wave shielding filter collects the broadcast information that the user listens to, and then shields the electromagnetic wave that interferes with the corresponding broadcast band thereby the user is able to listen to the corresponding broadcast without the noise.

The above description is merely illustrative of the technical idea of the present disclosure, those skilled in the art will appreciate that various modifications and variations may be made without departing from the essential characteristics of the present disclosure.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Accordingly, the embodiments disclosed in the present disclosure are intended not to limit but illustrate the technical idea of the present disclosure. The scope of the technical idea of the present disclosure is not limited by these embodiments. The scope of protection of the present disclosure should be construed in accordance with the following claims, and all technical ideas falling within an equivalent scope thereto shall be interpreted as being included in the scope of the present disclosure.

What is claimed is:

1. A reconfigurable electromagnetic wave shielding filter comprising:
    a loop-shaped shielding coil;
    a first capacitor having a first end connected to a start point of the shielding coil and a second end connected to an end point of the shielding coil;
    a second capacitor having a first end connected to the start point of the shielding coil and a second end connected to a first point and a second point of the shielding coil, wherein the first point and the second point are located between the start point and the end point, wherein the first point is located between the start point and the second point, wherein the second point is located between the first point and the end point; a first switch configured to switch a current flowing through the shielding coil to flow to either the second end of the first capacitor or the second end of the second capacitor; and
    a second switch configured to switch the current flowing through the shielding coil to flow to either the second end of the second capacitor or the first switch.

2. The reconfigurable electromagnetic wave shielding filter of claim 1, wherein when a pattern is generated such that the first end of the first capacitor is electrically connected to the start point of the shielding coil and the second end of the first capacitor is electrically connected to the end point of the shielding coil, the electromagnetic wave shielding filter is configured to shield an electromagnetic wave interfering with an AM broadcast band.

3. The reconfigurable electromagnetic wave shielding filter of claim 1, wherein when a pattern is generated such that the first end of the second capacitor is electrically connected to the start point of the shielding coil and the second end of the second capacitor is electrically connected to the first point of the shielding coil, the electromagnetic wave shielding filter is configured to shield an electromagnetic wave interfering with a DMB broadcast band.

4. The reconfigurable electromagnetic wave shielding filter of claim 1, wherein when a pattern is generated such that the first end of the second capacitor is electrically connected to the start point of the shielding coil and the second end of the second capacitor is electrically connected to the second point of the shielding coil, the electromagnetic wave shielding filter is configured to shield an electromagnetic wave interfering with a FM broadcast band.

5. The reconfigurable electromagnetic wave shielding filter of claim 1, wherein the first switch includes:
    a second field effect transistor (FET) positioned between the second point and the end point; and
    a fourth FET positioned at a rear face of a printed circuit board (PCB), wherein a first end of the fourth FET is connected to the second end of the second capacitor and a second end of the fourth FET is connected to the second point of the shielding coil.

6. The reconfigurable electromagnetic wave shielding filter of claim 5, wherein the second switch includes:
    a first FET positioned between the first point and the second point; and
    a third FET positioned at the rear face of PCB, wherein a first end of the third FET is connected to the second end of the second capacitor and a second end of the third FET is connected to the first point of the shielding coil.

7. The reconfigurable electromagnetic wave shielding filter of claim 1, wherein the shielding coil defines a closed-loop together with the first capacitor or the second capacitor.

8. A wireless charger for a vehicle having a reconfigurable electromagnetic wave shielding filter, the wireless charger comprising:
    a collecting unit configured to collect broadcast information being received by the vehicle;
    a voltage applying unit configured to apply a voltage to the reconfigurable electromagnetic wave shielding filter; and
    a controlling unit configured to control the voltage applying unit to generate a pattern corresponding to the broadcast information collected by the information collecting unit,
    wherein the reconfigurable electromagnetic wave shielding filter includes:
        a loop-shaped shielding coil;
        a first capacitor having a first end connected to a start point of the shielding coil and a second end connected to an end point of the shielding coil;
        a second capacitor having a first end connected to the start point of the shielding coil and the second end connected to a first point and a second point of the shielding coil, wherein the first point and the second point are located between the start point and the end point, wherein the first point is located between the start point and the second point, wherein the second point is located between the first point and the end point;

a first switch configured to switch a current flowing through the shielding coil to flow to either the second end of the first capacitor or the second end of the second capacitor; and a second switch configured to switch the current flowing through the shielding coil to flow to either the second end of the second capacitor or the first switch.

9. The wireless charger of claim 8, wherein the first switch includes:

a second Field Effect Transistor (FET) positioned between the second point and the end point; and a fourth FET positioned at a rear face of printed circuit board (PCB), wherein a first end the fourth FET is connected to the second end of the second capacitor and a second end of the fourth FET is connected to the second point of the shielding coil.

10. The wireless charger of claim 9, wherein the second switch includes:

a first FET positioned between the first point and the second point; and a third FET positioned at the rear face of PCB, a first end of the third FET is connected to the second end of the second capacitor and a second end third FET is connected to the first point of the shielding coil.

11. The wireless charger of claim 8, wherein the controlling unit controls the first switch and the second switch to generate a pattern such that the first end of the first capacitor is electrically connected to the start point of the shielding coil and the second end of the first capacitor is electrically connected to the end point of the shielding coil in order to shield an electromagnetic wave interfering with an AM broadcast band.

12. The wireless charger of claim 8, wherein the controlling unit controls the first switch and the second switch to generate a pattern such that the first end of the second capacitor is electrically connected to the start point of the shielding coil and the second end of the second capacitor is electrically connected to the first point of the shielding coil in order to shield an electromagnetic wave interfering with a DMB broadcast band.

13. The wireless charger for a vehicle having a reconfigurable electromagnetic wave shielding filter of claim 8, wherein the controlling unit controls the first switch and the second switch to generate a pattern such that the first end of the second capacitor is electrically connected to the start point of the shielding coil and the second end of the second capacitor is electrically connected to the second point of the shielding coil in order to shield an electromagnetic wave interfering with a FM broadcast band.

14. A method for controlling a reconfigurable electromagnetic wave shielding filter, the method comprising:

collecting broadcast information being received by a vehicle; and controlling the reconfigurable electromagnetic wave shielding filter to generate a pattern corresponding to the collected broadcast information, wherein the reconfigurable electromagnetic wave shielding filter includes:

a loop-shaped shielding coil;

a first capacitor having a first end connected to a start point of the shielding coil and a second end connected to an end point of the shielding coil;

a second capacitor having a first end connected to the start point of the shielding coil and the second end connected to a first point and a second point of the shielding coil, wherein the first point and the second point are located between the start point and the end point, wherein the first point is located between the start point and the second point, wherein the second point is located between the first point and the end point;

a first switch configured to switch a current flowing through the shielding coil to flow to either the second end of the first capacitor or the second end of the second capacitor; and a second switch configured to switch the current flowing through the shielding coil to flow to either the second end of the second capacitor or the first switch.

15. The method of claim 14, wherein controlling the reconfigurable electromagnetic wave shielding filter includes controlling the first switch and the second switch to generate a pattern such that the first end of the first capacitor is electrically connected to the start point of the shielding coil and the second end of the first capacitor is electrically connected to the end point of the shielding coil in order to shield an electromagnetic wave interfering with an AM broadcast band.

16. The method of claim 14, wherein controlling the reconfigurable electromagnetic wave shielding filter includes controlling the first switch and the second switch to generate a pattern such that the first end of the second capacitor is electrically connected to the start point of the shielding coil and the second end of the second capacitor is electrically connected to the first point of the shielding coil in order to shield an electromagnetic wave interfering with a DMB broadcast band.

17. The method of claim 14, wherein controlling the reconfigurable electromagnetic wave shielding filter includes controlling the first switch and the second switch to generate a pattern such that the first end of the second capacitor is electrically connected to the start point of the shielding coil and the second end of the second capacitor is electrically connected to the second point of the shielding coil in order to shield an electromagnetic wave interfering with a FM broadcast band.

* * * * *